United States Patent
Nagai

(10) Patent No.: US 11,958,125 B2
(45) Date of Patent: Apr. 16, 2024

(54) MANUFACTURING METHOD OF JOINED BODY

(71) Applicant: KYB Corporation, Tokyo (JP)

(72) Inventor: Yasuyuki Nagai, Nagano (JP)

(73) Assignee: KYB CORPORATION, Tokyo (JP)

( * ) Notice: Subject to any disclaimer, the term of this patent is extended or adjusted under 35 U.S.C. 154(b) by 449 days.

(21) Appl. No.: 17/278,213

(22) PCT Filed: Sep. 17, 2019

(86) PCT No.: PCT/JP2019/036412
§ 371 (c)(1),
(2) Date: Mar. 19, 2021

(87) PCT Pub. No.: WO2020/066756
PCT Pub. Date: Apr. 2, 2020

(65) Prior Publication Data
US 2021/0346978 A1    Nov. 11, 2021

(30) Foreign Application Priority Data

Sep. 27, 2018  (JP) ................... 2018-181925
Sep. 27, 2018  (JP) ................... 2018-181926

(51) Int. Cl.
*B23K 20/12*     (2006.01)
*F16B 7/00*      (2006.01)
*B23K 101/06*    (2006.01)

(52) U.S. Cl.
CPC ............. *B23K 20/12* (2013.01); *F16B 7/00* (2013.01); *B23K 2101/06* (2018.08)

(58) Field of Classification Search
None
See application file for complete search history.

(56) References Cited

U.S. PATENT DOCUMENTS 3,126,625 A * 3/1964 Laing ............... B23K 20/12
                                                 285/288.1
3,462,826 A   8/1969 Farmer et al.
(Continued)

FOREIGN PATENT DOCUMENTS

DE    1627482 A1    8/1970
DE    2735074 C2    10/1982
(Continued)

OTHER PUBLICATIONS

Hans J. Fahrenwaldt , Volkmar Schuler , Herbert Wittel , Jürgen Twdrek: Praxiswissen Schweißtechnik. 2. Aufl.. Wiesbaden : Vieweg+Teubner Verlag, 2006 (elektronisch: Sep. 12, 2007) (Vieweg Praxiswissen). I-IV, VII-XII, 99-101.—ISBN 978-3-8348-9192-1. https://link.springer.com/boo k/10.1007/978-3-8348-9192-1#toc [abgerufen am Nov. 17, 2023].

*Primary Examiner* — Devang R Patel
(74) *Attorney, Agent, or Firm* — Rabin & Berdo, P.C.

(57) ABSTRACT

A manufacturing method includes a joining step of abutting and joining an end surface of a tube main body and a projecting portion of a head member by frictional welding in a state in which a through hole of the tube main body and the projecting portion of the head member are fitted with a fitting clearance. In the joining step, flow material which is practically flowed from an end surface of the tube main body and the flange portion of the head member is filled in the fitting clearance from the root side until the tip portion is located within the range in the direction of the rotation axis, thereby joining between a non-contact portion and the tube main body and between an inclined inner peripheral surface of the tube main body and an outer peripheral surface of the projecting portion by the flow material.

6 Claims, 12 Drawing Sheets

(56) References Cited

U.S. PATENT DOCUMENTS

| | | | | |
|---|---|---|---|---|
| 3,793,704 | A * | 2/1974 | Antonevich | B23K 1/06 228/40 |
| 4,832,769 | A * | 5/1989 | Shantz | B29C 66/135 228/114.5 |
| 4,944,977 | A * | 7/1990 | Shantz | B29C 65/0672 428/35.8 |
| 8,286,852 | B2 * | 10/2012 | Kolbe | B23K 20/129 228/114 |
| 9,873,165 | B2 * | 1/2018 | Kobayashi | B23K 20/129 |
| 10,618,130 | B2 * | 4/2020 | Matsuyama | B23K 20/129 |
| 10,907,662 | B2 * | 2/2021 | Kobayashi | F15B 15/1438 |
| 11,534,852 | B2 * | 12/2022 | Nagai | B23K 20/12 |
| 2002/0121259 | A1 * | 9/2002 | Mizutani | B23K 20/1295 123/188.8 |
| 2010/0119772 | A1 * | 5/2010 | Christ | F16B 37/061 228/114.5 |
| 2016/0265473 | A1 * | 9/2016 | Jiang | F02F 1/4285 |
| 2018/0291934 | A1 * | 10/2018 | Kobayashi | B23K 20/12 |
| 2021/0346978 | A1 * | 11/2021 | Nagai | F16B 7/00 |

FOREIGN PATENT DOCUMENTS

| | | | | |
|---|---|---|---|---|
| DE | 4022303 | A1 | | 1/1992 |
| DE | 19519576 | A1 | | 12/1996 |
| DE | 102008007541 | A1 | | 8/2009 |
| JP | 2002235514 | A | | 8/2002 |
| JP | 2007229719 | A | * | 9/2007 |
| JP | 2008-012573 | A | | 1/2008 |
| JP | 2008012573 | A | * | 1/2008 |
| JP | 2017072160 | A | * | 4/2017 ............ B23K 20/12 |
| KR | 1020180049055 | A | | 5/2018 |
| WO | WO-2018180500 | A1 | * | 10/2018 .......... B21K 25/005 |

\* cited by examiner

MANUFACTURING METHOD OF JOINED BODY

TECHNICAL FIELD

The present invention relates to a manufacturing method of a joined body.

BACKGROUND ART

JP2008-12573A discloses a rotary friction welding method in which one member is joined to the other member by being pressed against the other member in parallel with the rotation axis while being, wherein a circular projecting portion projecting toward the other member and coaxially with the rotation axis is formed on the one member and a circular hole portion into which the circular projecting portion is inserted is formed on the other member.

SUMMARY OF INVENTION

In the friction welding method disclosed in JP2008-12573A, for example, a circular protrusion may be eccentric with respect to the rotary shaft due to the effect of machining accuracy. In the case, if causing the one member is rotated and to be joined to the other member, locally (non-uniform) contact between the outer periphery of the circular projecting portion and the inner periphery of the circular hole portion which are rotating eccentrically with respect to the rotation axis may occur. When such a locally contact occurs, a part in which the circular projecting portion and the circular hole portion are in contact is melted, there is a possibility that one member and the other member is joined at an unintentional point by the melted base material.

In order to suppress such unintentional joining, it is conceivable to increase a clearance between the circular projecting portion and the circular hole portion to suppress the contact between the circular projecting portion and the circular hole portion. However, increasing the clearance between the circular projecting portion and the circular hole portion, the surface area, which is in contact with the air, of the material (burr) flowing into the clearance increases, and therefore, an oxidation scale is likely to occur inside the circular hole portion.

It is an object of the present invention to provide a manufacturing method of a joined body capable of suppressing generation of an oxidized scale and suppressing joining failure.

According to an aspect of the present invention, a manufacturing method for manufacturing a joined body by joining a first member and a second member is provided. The first member has a hollow portion formed on an end surface. The second member has a projecting portion to be fitted into the hollow portion and a flange portion provided so as to extend radially outward from the projecting portion. The manufacturing method includes: a first joining step of generating frictional heat between the end surface of the first member and the flange portion of the second portion by relatively rotating the first member and the second member about a rotation axis in a state in which the hollow portion and the projecting portion are fitted with a predetermined fitting clearance, and by bringing the end surface of the first member and the flange portion of the second member into contact with each other; and, a second joining step of joining the end surface of the first member and the flange portion of the second member by relatively moving the first member and the second member along the rotation axis in a direction approaching each other in a state in which the relative rotation speed between the first member and the second member is lower than that in the first joining step. The first member includes an inclined inner peripheral surface having an inner diameter that decreases as the distance from the end surface of the first member along the rotation axis increases, the inclined inner peripheral surface of the first member forming the hollow portion. In the second joining step, flowing material is allowed to plastically flow from the end surface of the first member and the flange portion of the second member to fill the fitting clearance from a root side of the projecting portion until a tip portion of the flowing material reaches a region of the inclined inner peripheral surface in the rotation axial direction, thereby joining the first member with a non-contact portion of the flange portion facing the fitting clearance by the flowing material and joining the first member with the projecting portion by the flowing material.

DESCRIPTION OF EMBODIMENTS

Embodiments of the present invention will be described below with reference to the drawings.

In the following, the case where the joined body is a cylinder tube 100 of the hydraulic cylinder (a fluid pressure cylinder) 1.

An overall configuration of the hydraulic cylinder 1 provided with the cylinder tube 100 as the joined body will be described first with reference to FIG. 1.

The hydraulic cylinder 1 is an actuator that is extended/contracted by pressures of working oil (working fluid) in two cylinder chambers (i.e. a rod side chamber 3 and a counter rod side chamber 4).

Figure 1:
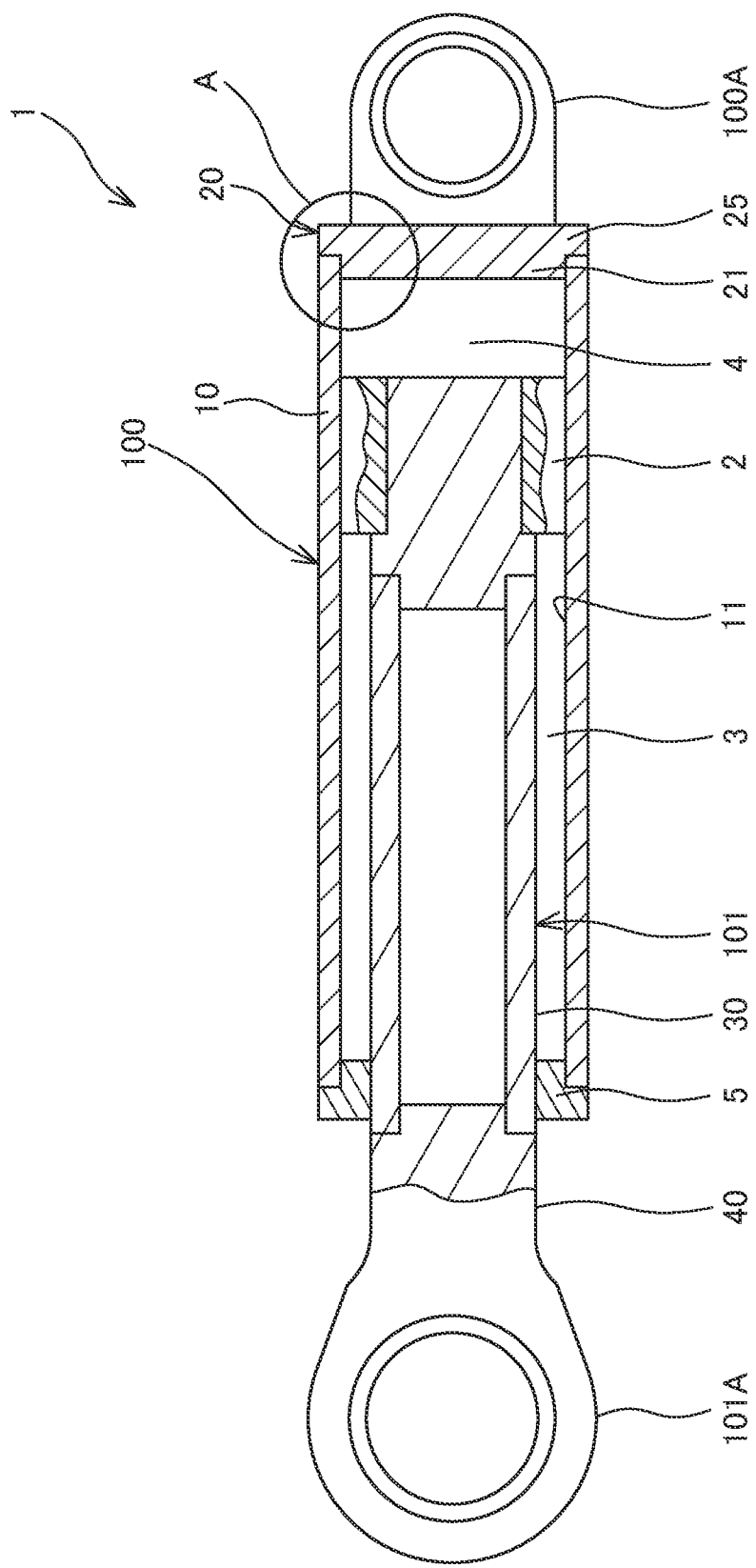
FIG. 1 is a partial sectional view showing a configuration of a hydraulic cylinder.

As shown in FIG. 1, the hydraulic cylinder 1 includes a cylindrical cylinder tube 100, a piston rod 101 that is inserted into the cylinder tube 100, and a piston 2 that is provided on an end portion of the piston rod 101 and that slides along an inner circumferential surface of the cylinder tube 100.

The cylinder tube 100 is provided with a cylindrical cylinder head 5 that seals an opening of the cylinder tube 100 on one end (tip end) and supports the piston rod 101 in a freely slidable manner. The cylinder head 5 is fastened to the cylinder tube 100 by a plurality of fastening bolts (not shown) arranged along the circumferential direction.

As shown in FIG. 1, attachment parts (devises) 100A and 101A for attaching the hydraulic cylinder 1 to other devices are respectively provided on a base end portion of the cylinder tube 100 and a tip end portion of the piston rod 101. The piston 2 is screw-fastened to a base end portion of the piston rod 101.

An interior of the cylinder tube 100 is partitioned by the piston 2 into the rod side chamber 3 and the counter rod side chamber 4. The rod side chamber 3 and the counter rod side chamber 4 are filled with working oil serving as a working fluid.

In the hydraulic cylinder 1, the working oil is supplied to the counter rod side chamber 4 and discharged from the rod side chamber 3 through ports (not shown) provided on the cylinder tube 100, and thereby, the piston rod 101 is moved in the extending direction. In addition, in the hydraulic cylinder 1, the working oil is supplied to the rod side chamber 3 and discharged from the counter rod side chamber 4, and thereby, the piston rod 101 is moved in the contracting direction. As the working oil is supplied to and discharged from the cylinder chambers (the rod side chamber 3 and the counter rod side chamber 4) within the cylinder tube 100 during the extension and contraction, the pressure of the working oil acts on the cylinder tube 100 as an internal pressure.

Next, a manufacturing method of the cylinder tube 100 will be described with reference mainly to FIGS. 2 to 6.

Figure 2:
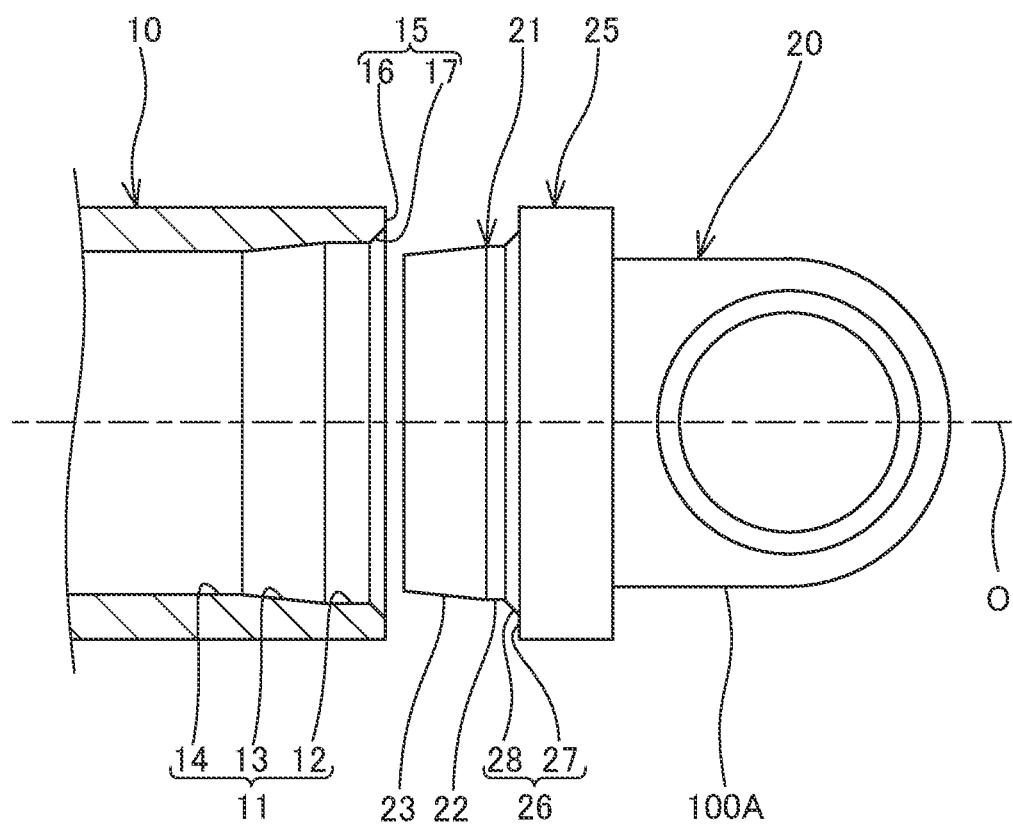
FIG. 2 is a sectional view for explaining a manufacturing method of a cylinder tube according to an embodiment of the present invention, and is a diagram showing a state before a joining.

As shown in FIG. 2, the cylinder tube 100 is manufactured by joining a tube main body 10 serving as a first member and a head member 20 serving as a second member by means of a friction welding. More specifically, the tube main body 10 and the head member 20 are joined by frictional heat generated by contact with each other in a state of being relatively rotated around the rotation axis O (joining step to be described later).

Figure 3:
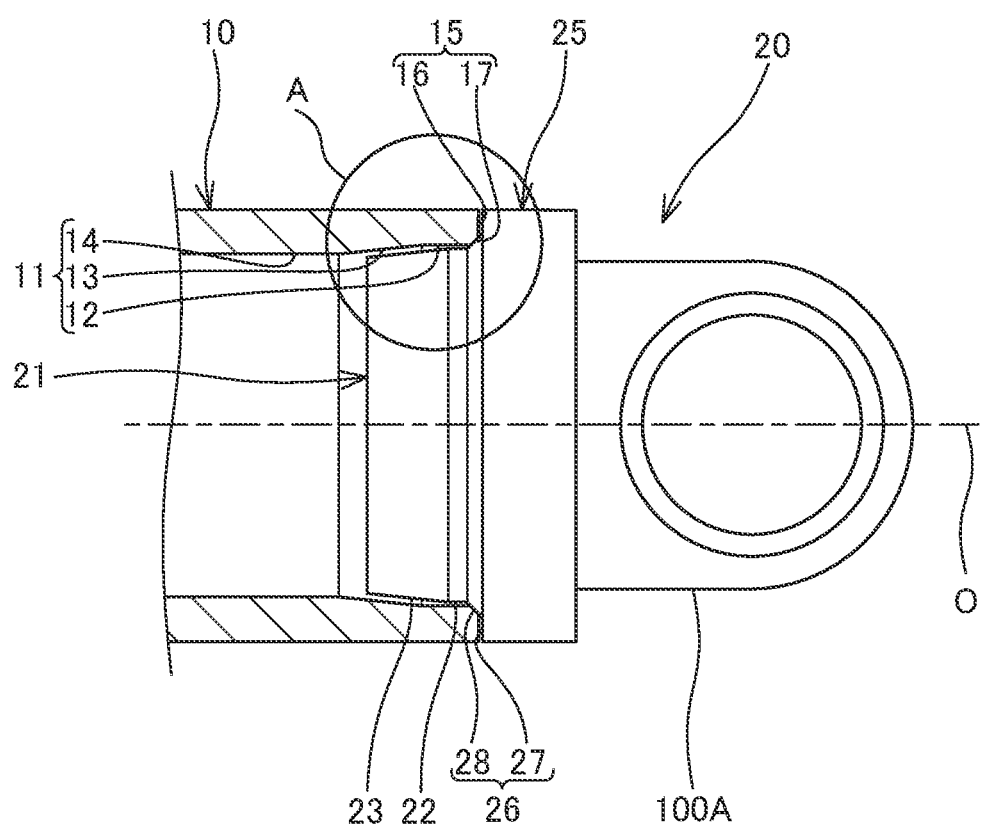
FIG. 3 is a sectional view for explaining the manufacturing method of the cylinder tube according to the embodiment of the present invention, and is a diagram showing a state in which the first member and the second member contact each other in the first joining step.
Figure 4:
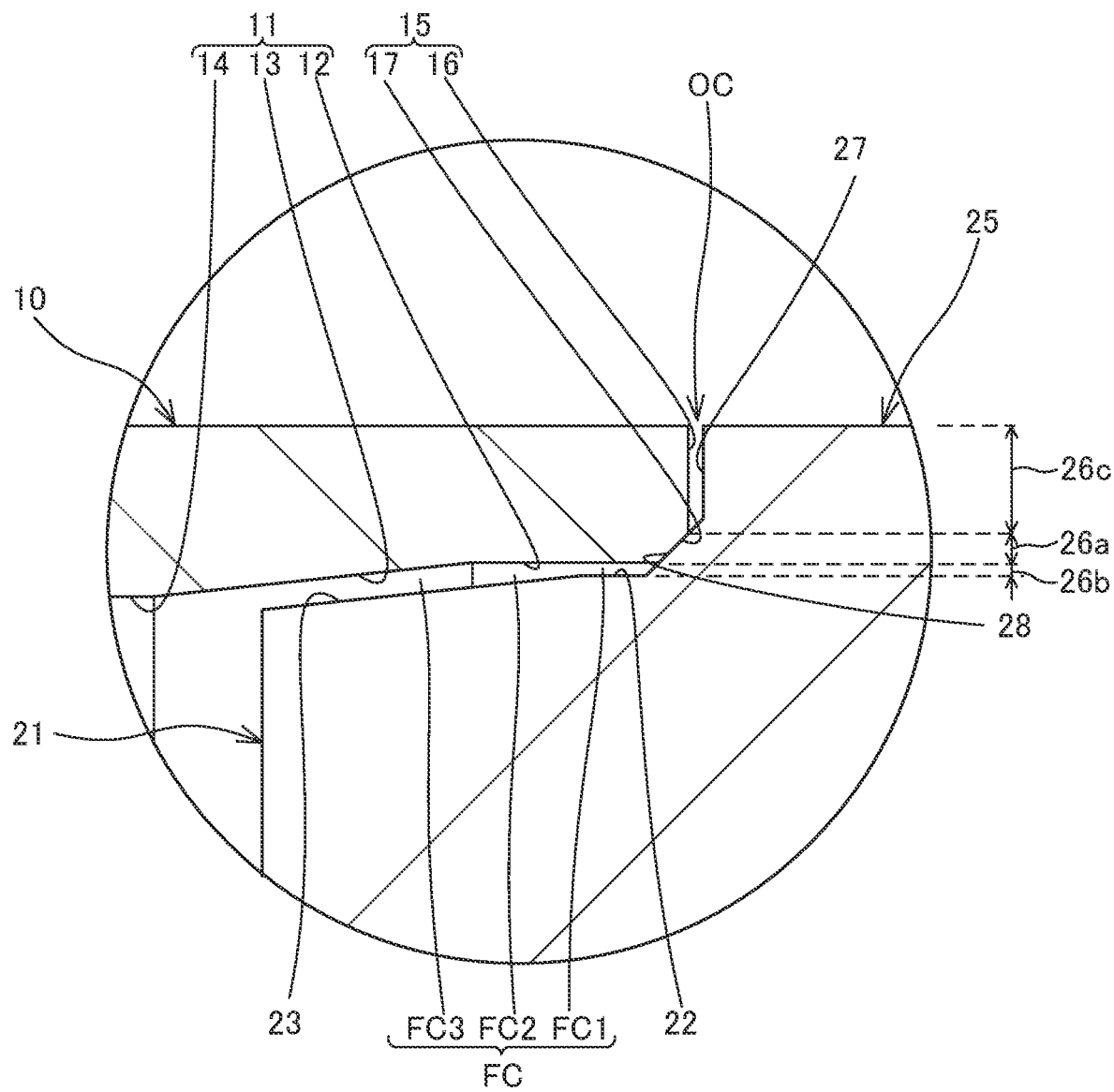
FIG. 4 is an enlarged view of a portion A in FIG. 3.

First, the configurations of the tube main body 10 and the head member 20 before joining will be described with reference to FIGS. 2 to 4. FIG. 2 shows a state in which the central axes of the tube main body 10 and the head member 20 are disposed coaxially with each other and coincident with the rotation axis O of the friction welding to be described later.

As shown in FIGS. 1 and 2, the tube main body 10 is formed to have a cylindrical shape having a through hole 11 that opens at both end surfaces 15 in the axial direction. The through hole 11 corresponds to a hollow portion formed in the end surface 15 of the tube main body 10 to be joined to the head member 20.

As shown in FIG. 2, the head member 20 is joined to one end surface 15 of the tube main body 10. The end surface 15 (joining face) to which the head member 20 is joined includes a vertical end surface 16 that is a flat surface perpendicular to the rotation axis O (the central axis of the tube main body 10) in the friction welding, and an inclined end surface 17 provided radially inside the vertical end surface 16 and formed to incline with respect to the rotation axis O. The vertical end surface 16 is an annular plane, and formed continuously with the outer peripheral surface of the tube main body 10. The inclined end surface 17 is a tapered surface inclined at 45° with respect to the rotation axis O, and connected to the vertical end surface 16 and the inner peripheral surface of the tube main body 10.

The inner peripheral surface of the tube main body 10 forming the through hole 11 serving as the hollow portion includes a first cylindrical inner peripheral surface (cylindrical inner peripheral surface) 12 which is connected to the inclined end surface 17 and formed as a cylindrical surface around the rotation axis O, the first cylindrical inner peripheral surface 12 and a inclined inner peripheral surface 13 which is continuous with the first cylindrical inner peripheral surface 12 and inclined with respect to the rotation axis O, and a second cylindrical inner peripheral surface 14 which is continuous with the inclined inner peripheral surface 13 and formed as a cylindrical surface around the O. The second cylindrical inner peripheral surface 14 is a sliding surface on which the piston 2 slides.

The inclined inner peripheral surface 13 is a tapered surface (conical surface) to incline with respect to the rotation axis O. The inclined inner peripheral surface 13 has an inner diameter that decrease as the distance from the end surface 15 as the joining face along the axial direction increases.

The head member 20 includes a projecting portion 21 which is formed so as to fit into the through hole 11 of the tube main body 10, and a flange portion 25 which is provided so as to extend radially outward from the projecting portion 21.

The attachment part 100A is provided on the flange portion 25 on the side opposite from the projecting portion 21 in the axial direction. The flange portion 25 is formed so as to have the same outer diameter as the outer diameter of the tube main body 10.

The end surface 26 of the flange portion 25 to be joined to the tube main body 10 has a flange vertical surface 27 which is an annular plane perpendicular to the rotation axis O, and a flange inclined surface 28 inclined to the rotation axis O. The flange vertical surface 27 is continuous with the outer peripheral surface of the flange portion 25 and the flange inclined surface 28.

The flange inclined surface 28 is a tapered surface (conical surface) formed to incline at 45° with respect to the central axis. The flange inclined surface 28 has the outer diameter that decreases as the distance from the flange vertical surface 27 toward the tube main body 10 along the rotation axis O increases. Thus, the inclined inner peripheral surface 13 of the tube main body 10 and the flange inclined surface 28 of the flange portion 25 are formed in the shape corresponding to each other, specifically, a tapered surface shape inclined at 45° with respect to the rotation axis O.

The projecting portion 21 is coaxially provided with the flange portion 25. The projecting portion 21 includes, as an outer peripheral surface, a cylindrical outer peripheral surface 22 which is formed as a cylindrical surface centered on the rotation axis O to be continuous to the flange inclined surface 28 of the flange portion 25, and an inclined outer peripheral surface 23 which is continuous to the cylindrical outer peripheral surface 22 and inclines with respect to the rotation axis O. The inclined outer peripheral surface 23 is a tapered surface (conical surface) having an outer diameter that decreases as the distance from the flange portion 25 along the rotation axis O increases. That is, in the projecting portion 21, the root portion connected to the flange portion 25 is formed in a cylindrical shape having a cylindrical outer peripheral surface 22, and the tip end portion away from the flange portion 25 is formed in a circular truncated cone shape having the inclined outer peripheral surface 23. In the following, in the projecting portion 21, the flange portion 25 side is referred to as "root" of the projecting portion 21, the opposite side of the root is referred to as "tip" of the projecting portion 21.

Next, the manufacturing method of the cylinder tube 100 as the joined body will be described.

The cylinder tube 100 is manufactured by the following manufacturing steps. The following step (2) corresponds to the first joining step, and the step (4) corresponds to the second joining step.

(1) First, as shown in FIG. 2, the tube main body 10 and the head member 20 are disposed coaxially such that the one end surface 15 (joining face) of the tube main body 10 and the end surface 26 (joining face) of the flange portion 25 of the head member 20 face each other.

(2) Next, while rotating the head member 20 about the rotation axis O, the tube main body 10 and the head member 20 are relatively moved in a direction close to each other along the rotation axis O. In the present embodiment, the tube main body 10 is moved toward the head member 20. As a result, as shown in FIGS. 3 and 4, the projecting portion 21 of the head member 20 fits into the through hole 11 of the tube main body 10 with a predetermined clearance (hereinafter referred to as "fitting clearance FC"), and the end surface 15 of the tube main body 10 and the end surface 26 of the flange portion 25 of the head member 20 contact each other (hereinafter the state referred to as "contact state").

Here, the contact state will be described in detail with reference to FIG. 4.

When in contact with the tube main body 10 and the head member 20 are brought close to each other along the rotation axis O so as to be in contact state, while the inclined end surface 17 of the tube main body 10 and the flange inclined surface 28 of the flange portion 25 of the head member 20 contact, the vertical end surface 16 of the tube main body 10 and the flange vertical surface 27 of the flange portion 25 are away from each other in the axial direction without contact. Therefore, a predetermined clearance (hereinafter referred to as "opposing clearance OC") is formed between the vertical end surface 16 of the tube main body 10 and the flange vertical surface 27 of the flange portion 25.

Further, in the contact state, a part which faces the fitting clearance FC in the end surface 26 (flange inclined surface 28) of the flange portion 25 also does not contact the tube main body 10.

In this manner, the end surface 26 of the flange portion 25 is sectioned, in the abutment state, into a part (hereinafter referred to as the "contact portion 26a") which contacts the end surface 15 of the tube main body 10 in the flange inclined surface 28, a part (hereinafter referred to as the "non-contact portion 26b") which is provided radially inward of the contact portion 26a and does not contact the end surface 15 of the tube main body 10, and a part (hereinafter referred to as the "clearance portion 26c") which is provided radially outward of the contact portion 26a and does not contact the end surface 15 of the tube main body 10.

The non-contact portion 26b is a part facing the fitting clearance FC in the end surface 26 of the flange portion 25, a part of the radially inner side of the flange inclined surface 28 corresponds to the non-contact portion 26b. That is, the non-contact portion 26b is a site for connecting the contact portion 26a and the projecting portion 21.

The clearance portion 26c is a part facing the opposing clearance OC in the end surface 26 of the flange portion 25, a part of the radially outer side of the flange inclined surface 28 and a whole of the flange vertical surface 27 correspond to the clearance portion 26c.

In the contact state, the projecting portion 21 of the head member 20 is fitted into the through hole 11 of the tube main body 10 such that the cylindrical outer peripheral surface 22 faces the first cylindrical inner peripheral surface 12 of the tube main body 10 and the inclined outer peripheral surface 23 faces the first cylindrical inner peripheral surface 12 and the inclined inner peripheral surface 13. In the contact state, the fitting clearance FC increases as it moves from the root side to the tip end side of the projecting portion 21. Specifically, the fitting clearance FC includes a radial clearance (hereinafter, referred to as the first clearance FC1.) between the first cylindrical inner peripheral surface 12 of the tube main body 10 and the cylindrical outer peripheral surface 22 of the projecting portion 21, a radial clearance (hereinafter, referred to as the second clearance FC2.) between the first cylindrical inner peripheral surface 12 and the inclined outer peripheral surface 23, and a radial clearance (hereinafter, referred to as the third clearance FC3.) between the inclined inner peripheral surface 13 and the inclined outer peripheral surface 23. The first clearance FC1 has a constant size along the axial direction. The size of the second clearance FC2 increases from the size of the first clearance FC1 as it moves toward the tip end side from the root side. The third clearance FC3 has a constant size along the axial direction. That is, the first clearance FC1 is the smallest clearance in the fitting clearance FC. The first clearance FC1 corresponds to the root side clearance, and the third clearance FC3 corresponds to the tip end side clearance.

It should be noted that "the fitting clearance FC increases from the root side toward the tip end side" means that there is no region where the clearance decreases as it moves from the root side toward the tip end side, and it is not excluded that the fitting clearance FC includes a region where the clearance is constant along the axial direction (for example, the first clearance FC1 between the first cylindrical inner peripheral surface 12 and the cylindrical outer peripheral surface 22). That is, "the fitting clearance FC increases from the root side toward the tip end side" means that a size of the fitting clearance FC at the tip end side position is the same or larger than the size at the root side position.

Figure 5:
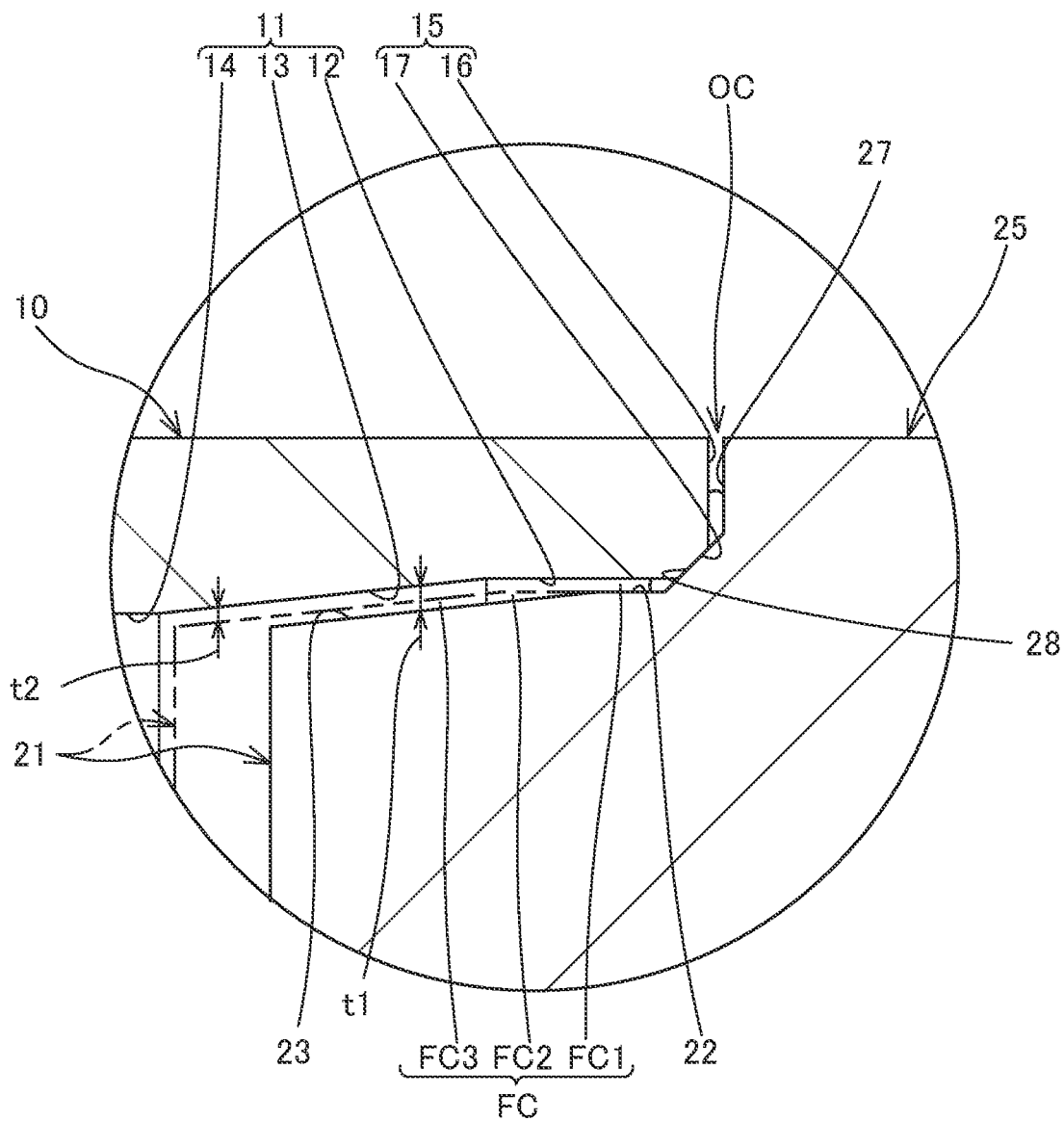
FIG. 5 is a sectional view for explaining the manufacturing method of the cylinder tube according to the embodiment of the present invention, and is a diagram showing the first joining step.

In the contact state as described above, frictional heat is generated between the inclined end surface 17 of the tube main body 10 and the contact portion 26a in the flange inclined surface 28 of the head member 20 by pressing the head member 20 rotating around the rotation axis O and the tube main body 10 with a predetermined pressing force. The inclined end surface 17 and the contact portion 26a are softened by the frictional heat. The non-contact portion 26b and the clearance portion 26c which does not contact the end surface 15 are also heated by the heat transfer from the softened contact portion 26a. Furthermore, as shown in FIG. 5, a part of the material of the inclined end surface 17 of the tube main body 10 and the contact portion 26a of the flange portion 25 which are softened flows to the fitting clearance FC and the opposing clearance OC. Therefore, the non-contact portion 26b of the flange portion 25, the cylindrical outer peripheral surface 22 of the projecting portion 21, and the first cylindrical inner peripheral surface 12 of the tube main body 10 which contact with the material flowing into the fitting clearance FC are also heated. The clearance portion 26c of the flange portion 25 and the vertical end surface 16 of the tube main body 10 which contact with the material flowing in the opposing clearance OC are also heated.

(3) When the non-contact portion 26b in the flange portion 25 is heated until sufficiently softened, the rotation of the head member 20 is stopped. Specifically, the movement amount or the pressing time by the pressing of the tube main body 10 until the non-contact portion 26b is softened is determined in advance by an experiment or the like, and the rotation of the head member 20 is controlled when the predetermined movement amount or the pressing time is reached.

(4) When the rotation of the head member 20 is stopped, the tube main body 10 is pressed against the head member 20 side with a further large pressing force so as to move toward the head member 20 by a predetermined amount. Thus, the heated high-temperature portion is plastically flowing to the outer peripheral side and the inner peripheral side. Flowing material plastically flowing on the inner peripheral side is guided to the fitting clearance FC between the inner peripheral surface of the tube main body 10 and the outer peripheral surface of the projecting portion 21, thereby filling the fitting clearance FC from the root side of the projecting portion 21.

Here, the two-dot chain line in FIG. 5 indicates the head member 20 when the relative rotation between the tube main body 10 and the head member 20 is stopped and both are brought close to each other. As described above, the inclined inner peripheral surface 13 has a shape in which the inner diameter decreases as it moves toward the end surface 15 of the tube main body 10. Therefore, when moving the head member 20 along the rotation axis O toward the tube main body 10, as shown in FIG. 5, the third clearance FC3 between the inclined inner peripheral surface 13 and the inclined outer peripheral surface 23 is reduced with the movement. Specifically, the size of the third clearance FC3 is reduced from the gap amount t1 to the gap amount t2.

In the step (4) described above, the material which plastically flows toward the inner periphery side fills the fitting clearance FC (the third clearance FC3) to the extent of the inclined inner peripheral surface 13 in the axial direction. In other words, as shown in FIG. 6, the amount of movement of the tube main body 10 in the axial direction is set such that the tip end portion T of the material plastically flowing on the inner peripheral side is located on the radial inside of the inclined inner peripheral surface 13 and reaches a region of the inclined inner peripheral surface 13 in the axial direction.

The flowing material plastically flowed to the outer peripheral side is guided to the opposing clearance OC and flows radially outward from the contact portion 26a so as to fill the opposing clearance OC. Further, the material plastically flowed to the outer peripheral side is discharged as a burr B to the outer periphery of the tube main body 10 (shown in FIG. 6).

Figure 6:
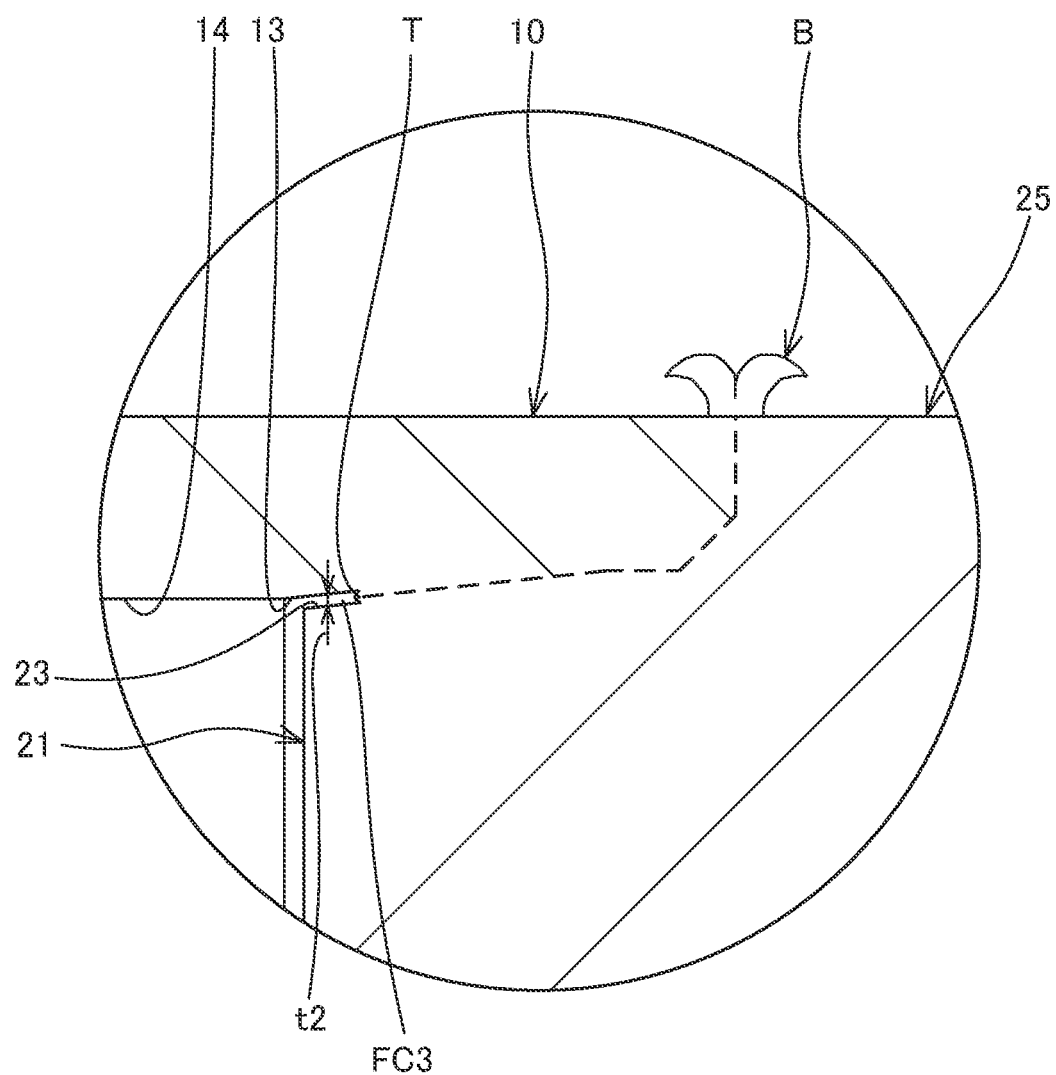
FIG. 6 is a sectional view for explaining the manufacturing method of the cylinder tube according to the embodiment of the present invention, and is a diagram showing a second joining step.

(5) Finally, by holding the pressing state of the above step (4) for a predetermined time, interdiffusion between the end surface 26 of the flange portion 25 of the head member 20 and the end surface 15 of the tube main body 10 which are heated to be softened is promoted, thereby completing the joining both the tube main body 10 and the head member 20 (see FIG. 6). In the head member 20, the contact portion 26a with which the end surface 15 of the tube main body 10 is in contact is softened by frictional heat, the non-contact portion 26b and the clearance portion 26c are also heated and softened. Therefore, as shown in FIG. 6, the head member 20 is joined to the tube main body 10 also at the non-contact portion 26b and the clearance portion 26c in addition to the contact portion 26a. It should be noted that the broken line in FIG. 6 indicates the joining interface between the tube main body 10 and the head member 20.

In the above step (2), a part of the material softened in the contact portion 26a and the non-contact portion 26b is guided to the fitting clearance FC between the inner peripheral surface of the tube main body 10 and the outer peripheral surface of the projecting portion 21. A part of the outer peripheral surface of the projecting portion 21 is also heated by frictional heat generated between the material flowing into the fitting clearance FC and the outer peripheral surface of the projecting portion 21. Therefore, the part of the outer peripheral surface of the projecting portion 21 which is heated and softened by frictional heat is also joined to the inner peripheral surface of the tube main body 10. Thus, in this embodiment, over the entire area of the end surface 26 of the flange portion 25 is joined to the tube main body 10, the joining interface indicated by a broken line in FIG. 6 is configured to extend radially outward from the root portion of the projecting portion 21 to the outer peripheral surface of the tube main body 10.

The tube main body 10 and the head member 20 are joined by the joining process as described above.

In the second joining step of the above step (4), the configuration is not limited to press the tube main body 10 and the head member 20 against each other with stopping the relative rotation thereof, the tube main body 10 and the head member 20 may be pressed against each other with the relative rotation speed (specifically, the rotational speed of the head member 20) lower than that of the first joining step of the above step (2). In other words, the friction welding of the manufacturing method of the joined body in the present embodiment may be a so-called brake type, it may be a flywheel type. In the claims, "a state in which the relative rotation speed between the first member and the second member is lower than the first joining step" means not only a state in which the relative rotation speed is larger than zero and lower than the relative rotation speed in the first joining step, but also a state in which the relative rotation speed is zero (that is, a state in which the relative rotation is stopped).

The burr B discharged to the outer peripheral side of the joining face between the tube main body 10 and the head member 20 is cut off after the joining is completed, and the outer peripheries of the tube main body 10 and the head member 20 are processed in a smoothly continuous state. In the case where the presence of the burr B is not a problem, the burr B may be left on the outer peripheral side of the cylinder tube 100 without performing the cutting of the burr B.

When the flowing material flows out from the fitting clearance to the inner space of the cylinder tube, burrs also occur on the inner peripheral side of the cylinder tube. In the process of cooling the flowing material in the fitting clearance to occur burrs, a so-called oxidation scale occurs. It is difficult to remove and clean the burrs and the oxidized scale on the inner peripheral side of the cylinder tube. When the working oil is guided inside the cylinder tube in such a state where burrs on the inner peripheral side occur, the oxidized scale is mixed into the working oil, there is a risk to occur a so-called contamination.

Therefore, in the joining step of the embodiment, the plastically flow of the materials is controlled to fill the fitting clearance FC without flowing out to the inner space of the cylinder tube 100. Specifically, the flowing material is controlled such that the tip portion T of the flowing material does not project from the end surface of the projecting portion 21 to the left side in FIG. 6 so as not to become burrs. As a result, it is possible to more effectively prevent the occurrence of contamination in the working oil. In other words, in the manufacturing method according to the embodiment, by controlling the plastically flow to the fitting clearance FC, it is possible to suppress burrs generated on the inner peripheral side of the cylinder tube 100.

Further, a quality inspection is performed on a friction welded portion between the tube main body 10 and the head member 20 by conducting a nondestructive test including an ultrasonic inspection etc. By performing such a quality inspection, it is possible to detect any joining failures etc. in the friction welded portion.

Next, an operational advantage of the manufacturing method of a joined body according to the present embodiment will be described.

In the present embodiment, the tube main body 10 has the inclined inner peripheral surface 13 having the inner diameter decreases toward the end surface 15 of the tube main body 10, the tip portion T of the flowing material to be filled in the fitting clearance FC locates within the region of the inclined inner peripheral surface 13 in the axial direction. In the above step (5), when moving the head member 20 along the rotation axis O toward the tube main body 10, the third clearance FC3 between the inclined inner peripheral surface 13 and the inclined outer peripheral surface 23 becomes smaller with the movement (see FIG. 5). That is, the third clearance FC3 in the contact state (FIG. 5 solid line, the gap amount t1) is relatively large, the third clearance FC3 at the time of joining completion (two-dot chain line in FIG. 5, the gap amount t2) is relatively small. Therefore, it is possible to set a relatively large third clearance FC3 in the contact state, it is possible to suppress unintentional contact of the inclined outer peripheral surface 23 to the inclined inner peripheral surface 13. Further, as the third clearance FC3 is set relatively small at the time of joining complete, the surface area at which the flowing material (burr) filled in the third clearance FC3 is in contact with air is reduced. Therefore, it is possible to suppress the generation of the oxidized scale formed by the burrs in the interior of the tube main body 10 (cylinder tube 100). Thus, since the third clearance FC3 is configured to be relatively large in the contact state and decrease at the time of joining completion, it is possible to simultaneously suppress the generation of the joining failure and the oxidized scale.

Further, in the joining by friction welding, the projecting portion of the head member may be rotated eccentrically with respect to the rotation axis due to the machining accuracy of the head member or misalignment between the head member and the rotary shaft. This may cause deflection of the projecting portion with respect to the rotary shaft. When the deflection of the projecting portion occurs, there is a risk that the inner peripheral surface of the through hole of the tube main body and the projecting portion of the head member unintentionally locally contact. If such localized contact occurs, the base material at the contact point melts, and there is a risk that a joining failure occurs in which the tube main body and the head member are joined to each other at an unintended point.

On the other hand, in the present embodiment, the fitting clearance FC is configured such that the first clearance FC1 closest to the root side is the smallest in the fitting clearance FC. Therefore, even if the projecting portion 21 is rotated around the rotation axis O in a state where the projecting portion 21 is eccentric with respect to the rotation axis O to cause the deflection of the projecting portion 21, a part of the cylindrical outer peripheral surface 22 at the root side is in contact with the tube main body 10, thereby preventing the inclined outer peripheral surface 23 of the tip end side of the projecting portion 21 from contacting the tube main body 10. As a result, it is possible to suppress the occurrence of burrs in the through hole 11 due to unintentional contact of the tip end side of the projecting portion 21 with the tube main body 10. Further, since the cylindrical outer peripheral surface 22 is in contact with the tube main body 10, further deflection of the projecting portion 21 is prevented. That is, since the first cylindrical inner peripheral surface 12 of the tube main body 10 and the cylindrical outer peripheral surface 22 of the projecting portion 21 form the smallest fitting clearance FC (first clearance FC1) at the root side of the projecting portion 21, the deflection the projecting portion 21 is suppressed to the size of the first clearance FC1. Therefore, it is possible to further suppress the joining failure.

Further, in the present embodiment, the end surface 15 of the tube main body 10 and the end surface 26 of the flange portion 25 are formed such that the inclined end surface 17 and the flange inclined surface 28 contact at the radially inner side, and the vertical end surface 16 and the flange vertical surface 27 does not contact to form the opposing clearance OC at the radially outer side. Thus, frictional heat is generated in the relatively radially inner region at the beginning of the friction welding, then frictional heat is generated in the radially outer region. Thus, since the frictional heat can be controlled to be generated sequentially from the radially inner side toward the outer side, it is easy to flow the flowing material toward the radially outer side. In other words, since the opposing clearance OC is provided on the radially outer side, the flowing material, which is melted between the inclined end surface 17 of the tube main body 10 and the flange inclined surface 28 of the flange portion 25 being in contact with in the beginning of the process, tends to flow radially outward toward the opposing clearance OC. In this way, it is possible to control the burr caused by friction welding and improve the joining quality of the joined body.

Further, in the present embodiment, the end surface 26 of the flange portion 25 is continuous with the cylindrical outer peripheral surface 22 of the outer peripheral surface of the projecting portion 21 by the flange inclined surface 28.

Therefore, a boundary part between the flange portion 25 and the projecting portion 21 does not form a right angle corner. Since it is difficult to fill the flowing material into the corner at right angle, by a configuration in which the corner at the right angle is not formed is accepted, the flowing material from between the inclined end surface 17 of the tube main body 10 and the contact portion 26a of the flange portion 25 is easily filled in the fitting clearance FC. As a result, the flowing material can be easily controlled and the quality of the joined body can be improved.

According to the present embodiment, in addition to the contact portion 26a contacting with the tube main body 10, the non-contact portion 26b is also joined to the tube main body 10 by heating and softening the non-contact portion 26b. Thus, the cylinder tube 100 such that the joint interface between the head member 20 and the tube main body 10 extends from the root portion of the projecting portion 21 in the head member 20 to the outer peripheral surface of the flange portion 25 and the tube main body 10 is formed. Therefore, the fitting clearance FC before joining does not remain so that the joined portion between the tube main body 10 and the head member 20 has a solid structure. Therefore, it is prevented from detecting the fitting clearance FC before joining as a defect in the non-destructive test, and the quality inspection by the non-destructive test can be easily performed.

Next, a modification of the present embodiment will be described. The following modifications are also within the scope of the present invention, and it is possible to combine the following modifications with the respective configurations of the above-described embodiments, or to combine the following modifications. Also, the modification described in the description of the above embodiment can be arbitrarily combined with other modifications in the same manner.

Hereinafter, with reference to FIGS. 7 to 9, a description will be given of a modification with respect to the outer peripheral surface of the inner peripheral surface and the projecting portion 21 of the through hole 11 of the tube main body 10.

In the above embodiment, the inner peripheral surface of the tube main body 10 includes the first cylindrical inner peripheral surface 12 continuous with the end surface 15 as the joining surface, the inclined inner peripheral surface 13 continuous to first cylindrical inner peripheral surface 12, and the second cylindrical inner peripheral surface 14 continuous to the inclined inner peripheral surface 13. The outer peripheral surface of the projecting portion 21 has a cylindrical outer peripheral surface 22 continuous with the end surface 26 of the flange portion 25, and the inclined outer peripheral surface 23 continuous with the cylindrical outer peripheral surface 22. On the other hand, the inner peripheral surface of the tube main body 10 and the outer peripheral surface of the projecting portion 21 can be any configuration as long as the fitting clearance FC is configured to decrease with moving the tube main body 10 toward the head member 20 in the above step (4). That is, as long as the fitting clearance FC is configured to decrease with moving the tube main body 10 toward the head member 20, it is possible to exhibit the effect of suppressing the joining failure and the generation of the oxidized scale at the same time.

Specifically, it is sufficient that the inclined inner peripheral surface 13 is provided on the tube main body 10, and the inclined inner peripheral surface 13 and the outer peripheral surface of the projecting portion 21 are joined by flowing material of which the tip portion T is located in the axial range of the inclined inner peripheral surface 13 should be applied. For example, as shown in FIG. 7, the outer peripheral surface of the projecting portion 21 may not have the inclined outer peripheral surface 23. In the modification shown in FIG. 7, the outer peripheral surface of the projecting portion 21 is composed only of a cylindrical outer peripheral surface 22 having the uniform outer diameter. Conversely, as shown in FIG. 8, the outer peripheral surface of the projecting portion 21 may not have the cylindrical outer peripheral surface 22. In the modification shown in FIG. 8, the outer peripheral surface of the projecting portion 21 is composed only of the inclined outer peripheral surface 23 of which the outer diameter decreases toward the tip thereof.

Figure 9:
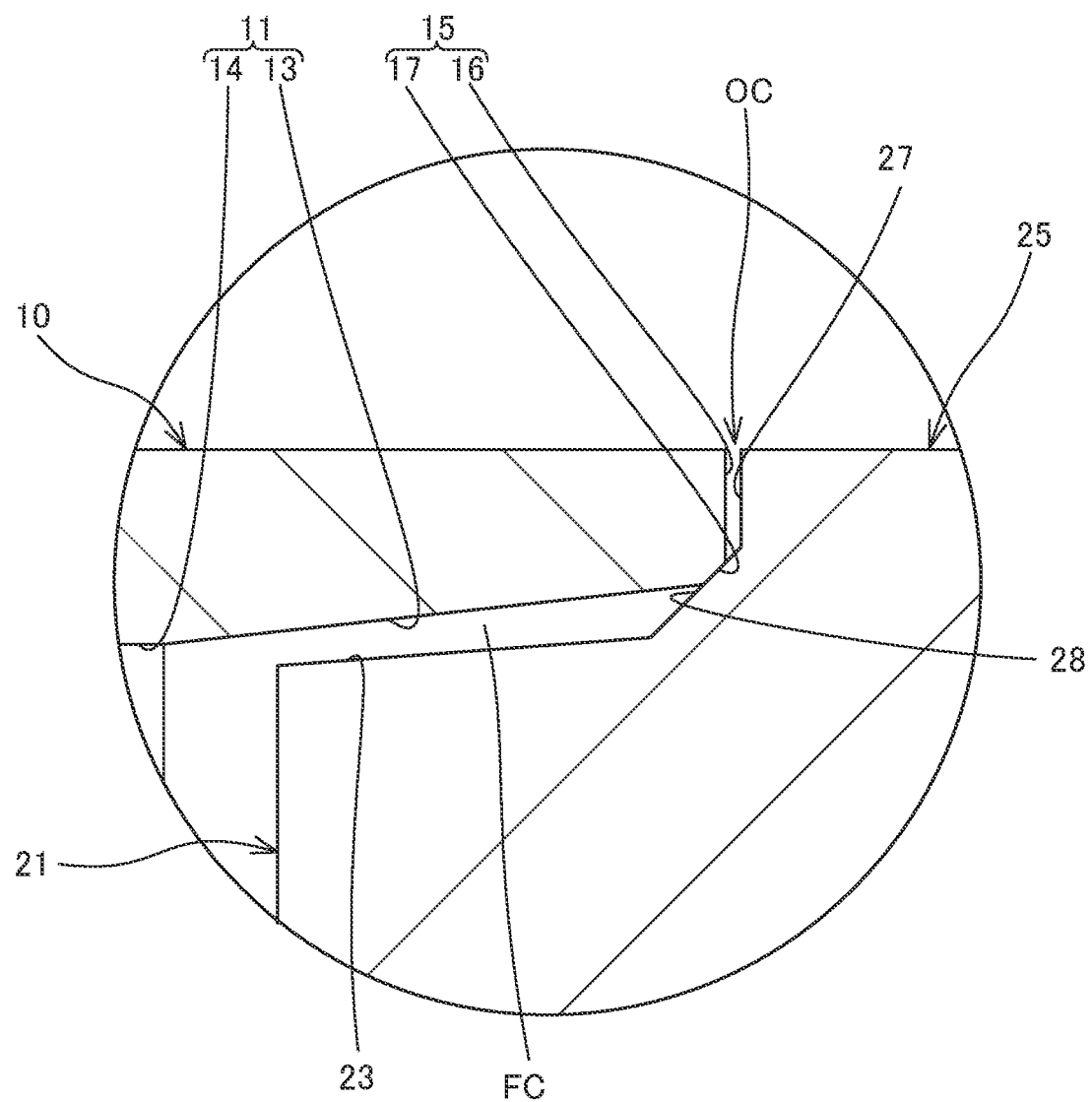
FIG. 9 is an enlarged cross-sectional view corresponding to FIG. 4 for explaining a third modification of the manufacturing method of the cylinder tube according to the embodiment of the present invention, and is a view showing a state in which the first member and the second member contact each other.

Further, as shown in FIG. 9, the inner peripheral surface of the tube main body 10 may not have the first cylindrical inner peripheral surface 12. In the modification shown in FIG. 9, the inclined inner peripheral surface 13 is continuous to the end surface 15 which is a joining face (inclined end surface 17).

Further, as shown in FIG. 9, the fitting clearance FC may not be increased as it goes from the root side to the tip end side of the projecting portion 21. In the modification shown in FIG. 9, in the inner peripheral surface of the tube main body 10, the inclined inner peripheral surface 13 is continuous with the end surface 15, and the outer peripheral surface of the projecting portion 21 is composed only of the inclined outer peripheral surface 23. In this modification, the inclination angle of the inclined inner peripheral surface 13 is larger than the inclination angle of the inclined outer peripheral surface 23. Therefore, the fitting clearance FC decreases from the root side toward the tip side. Even in this case, when the minimum clearance of the fitting clearance FC formed at the tip end side is set to have a size to allow the deflection of the projecting portion 21 (i.e. the projecting portion 21 is not in contact with the tube main body 10 by the deflection), it is possible to suppress the unintentional contact between the projecting portion 21 and the tube main body 10 due to the deflection of the projecting portion 21.

Figure 7:
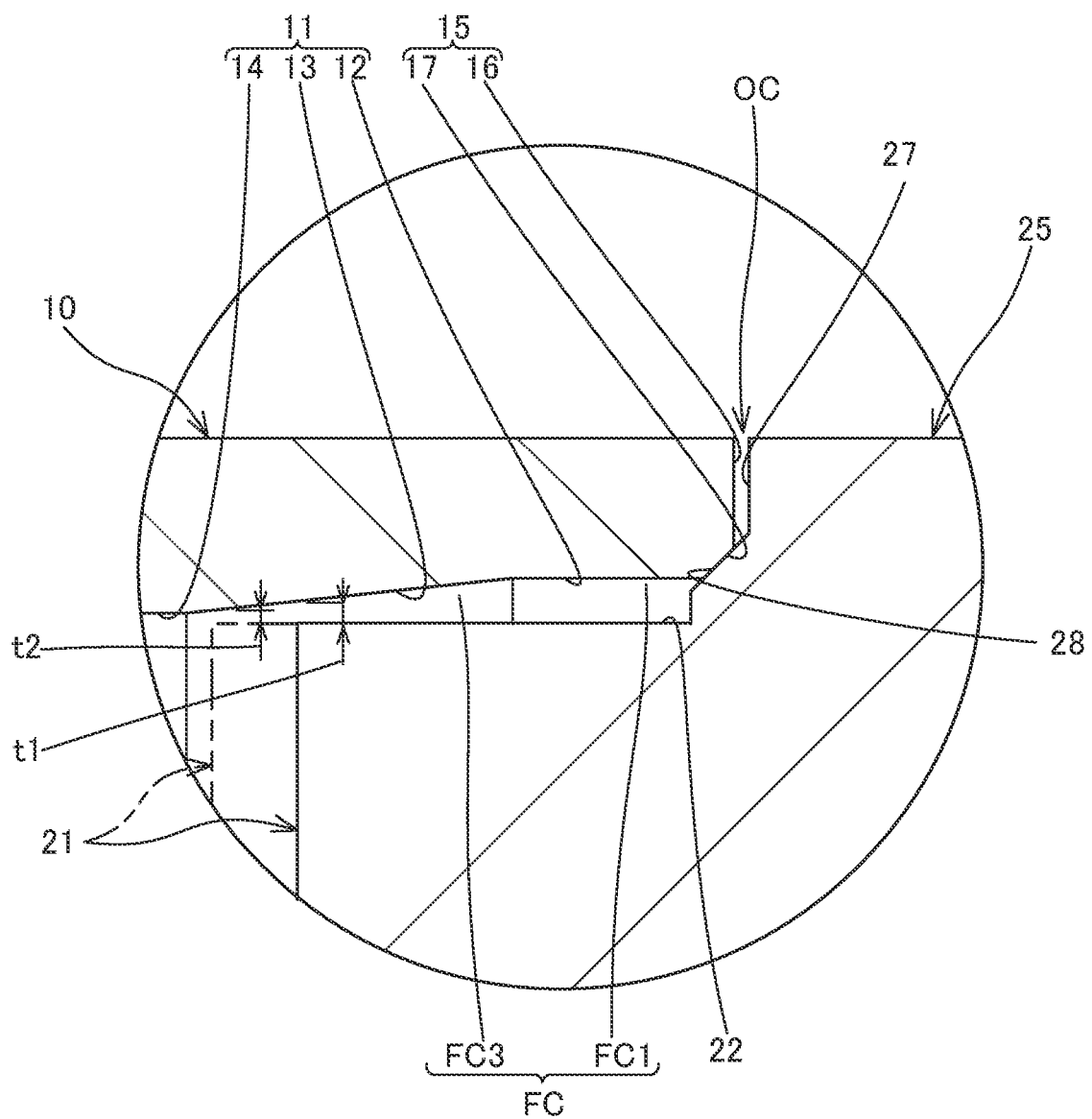
FIG. 7 is an enlarged cross-sectional view corresponding to FIG. 4 for explaining a first modification of the manufacturing method of the cylinder tube according to the embodiment of the present invention, and is a view showing a state in which the first member and the second member contact each other.
Figure 8:
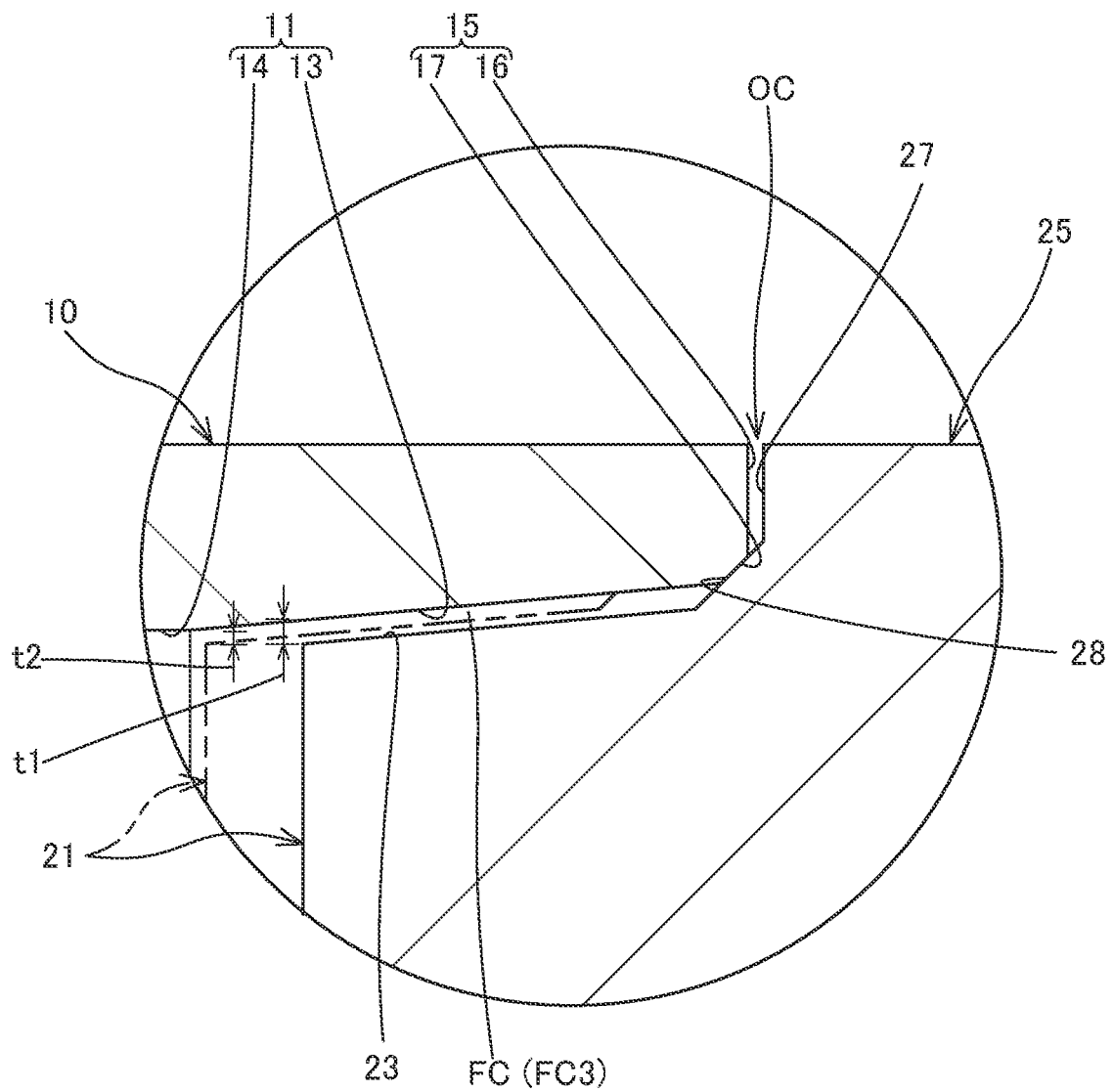
FIG. 8 is an enlarged cross-sectional view corresponding to FIG. 4 for explaining a second modification of the manufacturing method of the cylinder tube according to the embodiment of the present invention, and is a view showing a state in which the first member and the second member contact each other.

In the modification shown in FIGS. 7 to 9, as the tube main body 10 is moved toward the head member 20, the fitting clearance FC formed by the inclined inner peripheral surface 13 decreases, and the tip portion T of the flowing material is filled into the fitting clearance FC which decreases as the moving. Hence, the modifications shown in FIGS. 7 to 9 exhibit the effect of suppressing the joining failure and the generation of the oxidizing scale at the same time.

Although not shown, the inclined inner peripheral surface 13 and the inclined outer peripheral surface 23 is not limited to a tapered surface inclined with respect to the rotation axis O, respectively (conical surface), for example, may be a curved surface.

Further, in the case where the inclined outer peripheral surface 23 is provided on the outer peripheral surface of the projecting portion 21, although the inclined inner peripheral surface 13 and the inclined outer peripheral surface 23 are desirable to be formed in a shape corresponding to each other, they may not be the shape corresponding to each other. As in the modification shown in FIG. 9, in the case where the inclined inner peripheral surface 13 and the inclined outer peripheral surface 23 is formed as a tapered surface, although the inclination angles of the inclined inner peripheral surface 13 and the inclined outer peripheral surface 23 are desirable to coincide, they may not coincide. As shown in FIG. 9, the inclined inner peripheral surface 13 may have a relatively large inclination angle, or the inclined outer peripheral surface 23 may have a relatively large inclination angle although not shown.

Next, with reference to FIGS. 10 and 11, modifications relating to the end surface 15 (joining face) of the tube main body 10 and the end surface 26 (joining face) of the flange portion 25 of the head member 20 will be described.

In the above embodiment, the inclined end surface 17 of the tube main body 10 and the flange inclined surface 28 of the flange portion 25 are in contact to each other, and the opposing clearance OC is formed by the vertical end surface 16 of the tube main body 10 and the flange vertical surface 27 of the flange portion 25. In other words, the contact portion 26a of the flange portion 25 is provided on the flange inclined surface 28, the clearance portion 26c is mainly constituted by the flange vertical surface 27.

On the other hand, as long as the end surface 15 of the tube main body 10 and the end surface 26 of the flange portion 25 contact each other at a relatively radially inner region in the beginning of the manufacturing process, and thereafter contact at relatively radially outer region, it is not limited to the above configuration.

Figure 10:
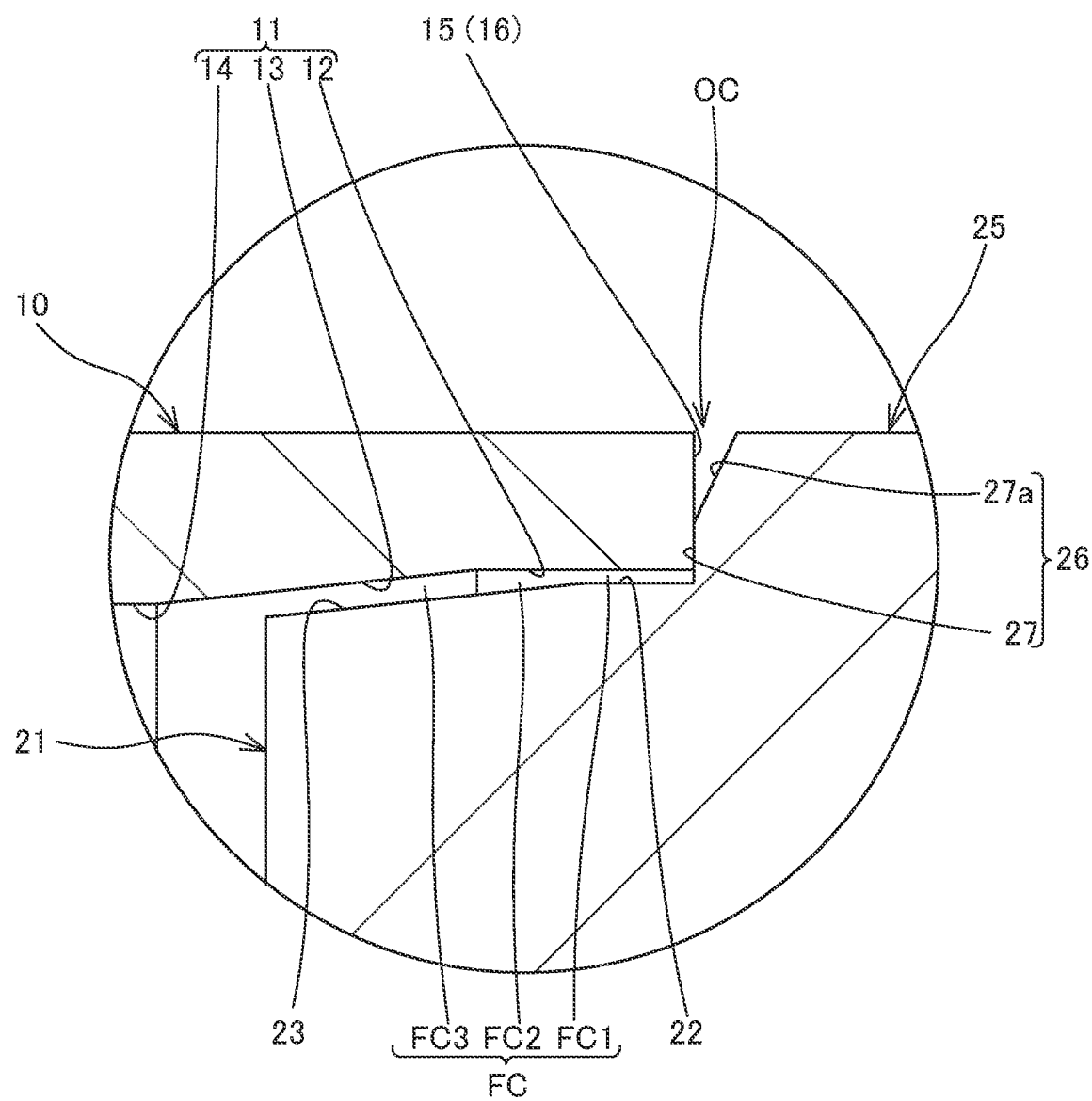
FIG. 10 is an enlarged cross-sectional view corresponding to FIG. 4 for explaining a fourth modification of the manufacturing method of the cylinder tube according to the embodiment of the present invention, and is a view showing a state in which the first member and the second member contact each other.
Figure 11:
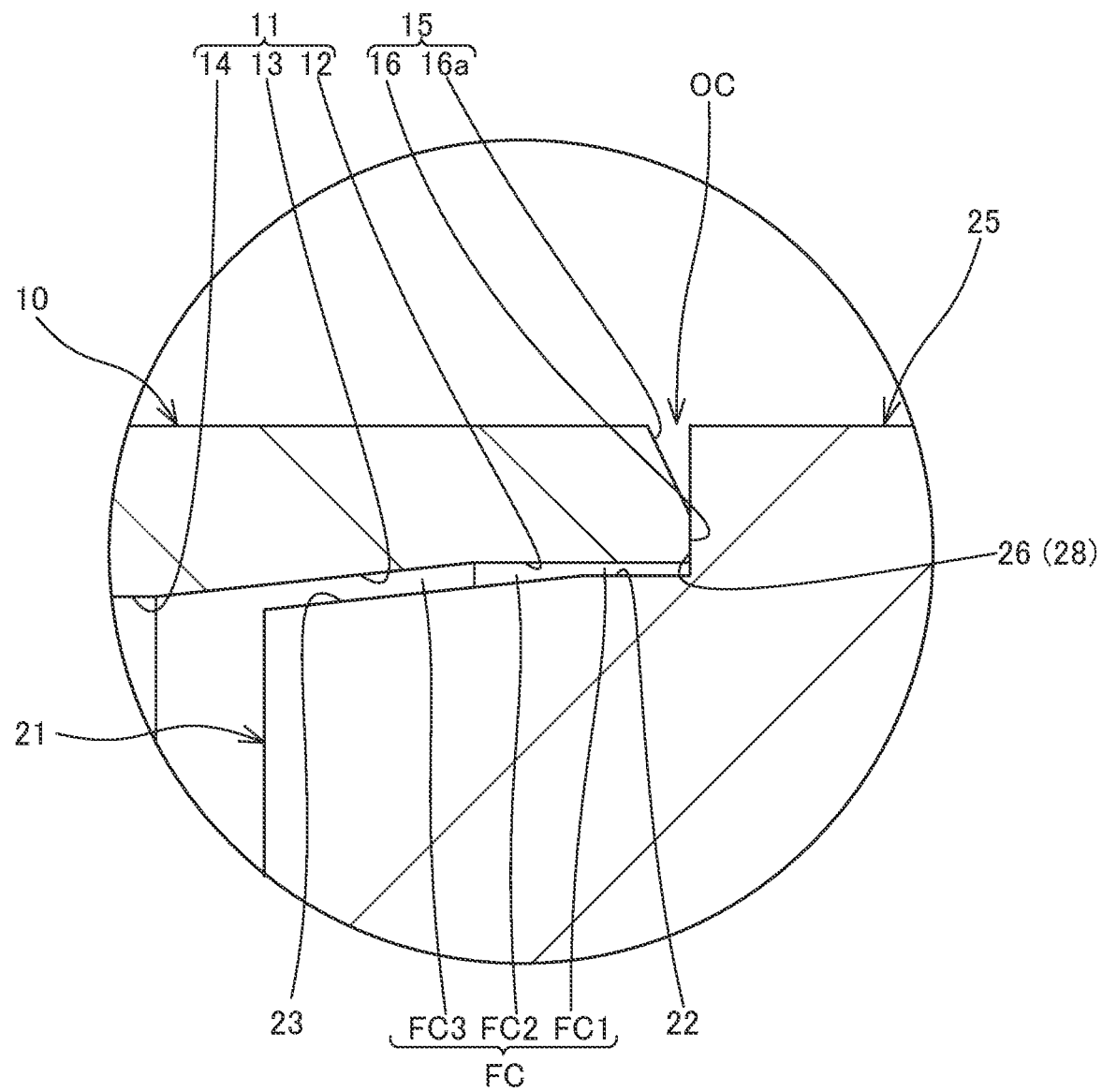
FIG. 11 is an enlarged cross-sectional view corresponding to FIG. 4 for explaining a fifth modification of the manufacturing method of the cylinder tube according to the embodiment of the present invention, and is a view showing a state in which the first member and the second member contact each other.

For example, as shown in FIGS. 10 and 11, the end surface 15 of the tube main body 10 may not have the inclined end surface 17, and the end surface 26 of the flange portion 25 may not have the flange inclined surface 28. That is, the tube main body 10 and the head member 20 may not be in contact with each other on the inclined surfaces.

In the modification shown in FIG. 10, the end surface 15 of the tube main body 10 is constituted by only the vertical end surface 16 which is a flat surface perpendicular to the rotation axis O. The end surface 26 of the flange portion 25 includes the flange vertical surface 27 perpendicular to the rotation axis O, the flange vertical surface 27 being continuous with the outer peripheral surface of the projecting portion 21, and the outer inclined surface 27a extending in the direction of the rotation axis O so as to be spaced from the end surface 15 of the tube main body 10, the outer inclined surface 27a being provided on the radially outer side of the flange vertical surface 27. In the contact state, the vertical end surface 16 of the tube main body 10 and the flange vertical surface 27 of the flange portion 25 are in contact with each other, the outer inclined surface 27a of the flange portion 25 forms the opposing clearance OC between with the vertical end surface 16 of the tube main body 10. That is, in the modification of FIG. 10, the outer inclined surface 27a constitutes the clearance portion 26c.

Further, in the modification shown in FIG. 11, the end surface 15 of the tube main body 10 includes the vertical end surface 16 perpendicular to the rotation axis O, the vertical end surface 16 being continuous with the inner peripheral surface (the first cylindrical inner peripheral surface 12 in FIG. 11) of the through hole 11, and the outer inclined end surface 16a extending in the direction of the rotation axis O so as to be spaced from the end surface 26 of the flange portion 25, the outer inclined end surface 16a being provided on the radially outer side of the vertical end surface 16. The end surface 26 of the flange portion 25 is constituted by only the flange vertical surface 27 perpendicular to the rotation axis O. In the contact state, and a radially inner part of the flange vertical surface 27 of the flange portion 25 is in contact with the vertical end surface 16 of the tube main body 10, and a radially outer part of the flange vertical surface 27 of the flange portion 25 forms the opposing clearance OC with between the outer inclined end surface 16a of the tube main body 10. That is, in the modification of FIG. 11, the radially outer part of the flange vertical surface 27 which faces the outer inclined end surface 16a of the tube main body 10 constitutes the clearance portion 26c.

Also in the modifications shown in FIGS. 10 and 11, the end surface 15 of the tube main body 10 and the end surface 26 of the flange portion 25 are in contact with each other at a relatively radially inner region in the beginning of the manufacturing process, and thereafter contact at relatively radial outer region. Therefore, even in the modifications shown in FIGS. 10 and 11, it is possible to control the burr B so as to flow radially outward.

Further, in the modifications shown in FIGS. 10 and 11, the tube main body 10 and the head member 20 are in contact with each other in planes perpendicular to the pressing direction (direction along the rotation axis O). Thus, it is easy to control the relative movement amount along the rotation axis O between the tube main body 10 and the head member 20 in friction welding, thereby improving the dimensional accuracy of the length of the joined body along the rotation axis O.

The modifications shown in FIGS. 10 and 11 may be combined so that the outer inclined end surface 16a is provided on the end surface 15 of the tube main body 10, the outer flange inclined surface 28a is provided on the end surface 26 of the flange portion 25, and the outer inclined end surface 16a and the outer flange inclined surface 28a form the opposing clearance OC.

Next, modifications other than the above will be described.

In the above embodiment, the joined body is the cylinder tube obtained by joining the tube main body 10 and the head member 20. On the other hand, the joined body is not limited to the cylinder tube, and may be, for example, the piston rod 101.

Figure 12:
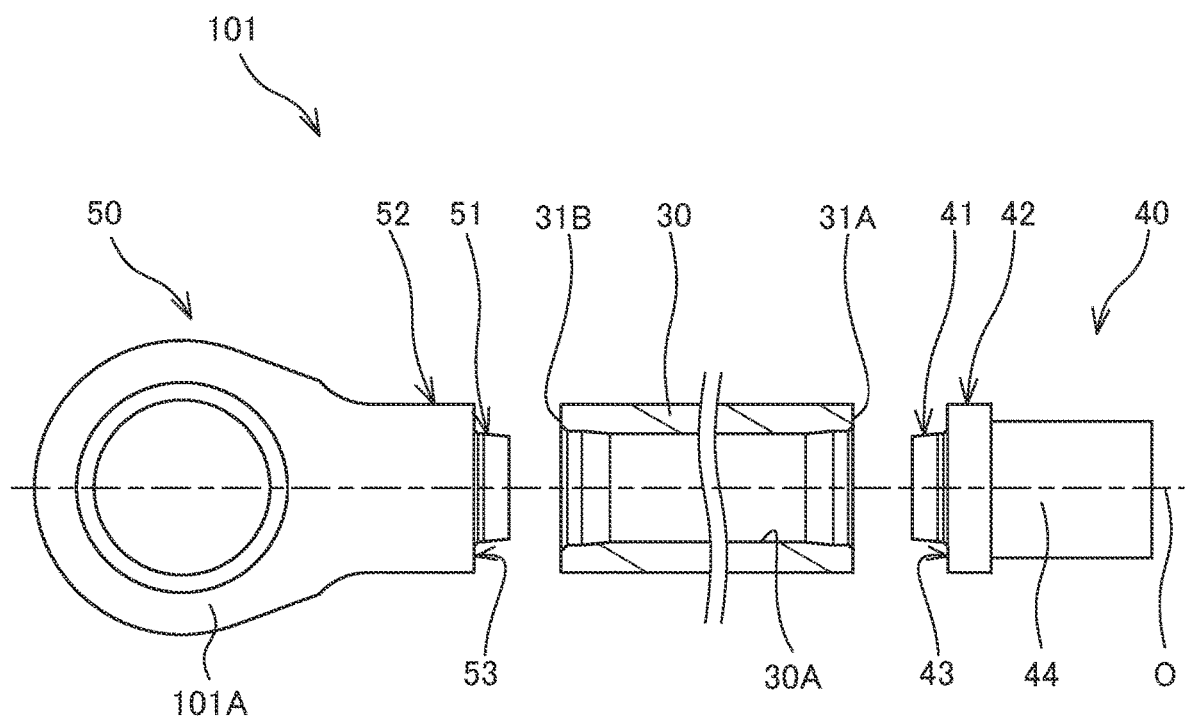
FIG. 12 is a cross-sectional view for explaining the manufacturing method of the piston rod according to the embodiment of the present invention.

When the joined body is the piston rod 101, as shown in FIG. 12, the piston rod 101 is manufactured by joining a rod body 30 serving as a first member, and a screw member 40 and a rod head 50 serving as a second member, respectively, by friction welding.

A through hole 30A serving as a hollow portion which opens to both end surfaces 15 thereof in the axial direction is formed in the rod body 30. Although not shown in detail, inclined inner peripheral surfaces 13 similar to those of the above embodiment are provided at both ends of the through hole 11. Further, both end surfaces 31A of the rod body 30, 31B are respectively configured similarly to the end surface 15 of the tube main body 10 in the above embodiment.

The screw member 40 has a projecting portion 41 which is formed so as to fit into the through hole 30A of the rod body 30, and a flange portion 42 which is provided radially outward from the projecting portion 41. The flange portion 42, on the opposite side of the axial direction to the projecting portion 41, a boss portion 44 is provided on the flange portion 42 on the side opposite from the projecting portion 41 in the axial direction. The boss portion 44 is formed with the male screw on the outer periphery thereof and screwed with the piston 2. The flange portion 42 has an outer diameter formed to be equal to the outer diameter of the rod body 30.

The rod head 50 has a projecting portion 51 which is formed so as to fit into the through hole 30A of the rod body 30, and a flange portion 52 which is provided radially outward from the projecting portion 51. The flange portion 52 is provided with a mounting portion 101A on a side opposite from the projecting portion 51 in the axial direction. The flange portion 52 has an outer diameter formed to be equal to the outer diameter of the rod body 30.

Although not shown in detail, each of the projecting portion 41, 51 of the screw member 40 and the rod head 50 is configured similarly to the projecting portion 21 of the head member 20 in the above embodiment. Further, the end surfaces 43 and 53 of the flange portions 42 and 52 in each of the screw member 40 and the rod head 50 is configured similarly to the end surface 26 of the flange portion 25 of the head member 20 in the above embodiment.

Therefore, the piston rod 101 can be manufactured by joining the rod body 30 and the screw member 40, and the rod body 30 and the rod head 50 by the same configuration as in the manufacturing method of the joined body in the above embodiment.

According to the embodiment mentioned above, the advantages described below are afforded.

In the present embodiment, the tube main body 10 has the inclined inner peripheral surface 13 having the inner diameter which is decreases toward the end surface 15 of the tube main body 10, the tip portion T of the flowing material to be filled in the fitting clearance FC is located within the axial range of the inclined inner peripheral surface 13. Therefore, the fitting clearance FC between the outer peripheral surface of the projecting portion 21 and the inclined inner peripheral surface 13 decrease as the tube main body 10 and the head member 20 are pressed against each other along the rotation axis O. Thus, even if the fitting clearance FC is set to be relatively large so that the tube main body 10 and the projecting portion 21 of the head member 20 do not come into contact each other unintentionally in the contact state, the flowing material is filled in the relatively small fitting clearance FC formed when the joining is completed. As a result, the surface area at which the flowing material filled in the fitting clearance FC is in contact with the air is reduced, and the generation of oxidation scale is suppressed. Therefore, according to the manufacturing method of the joined body in the embodiment, it is possible to suppress the occurrence of the oxidation scale and the joining failure.

In addition, in the present embodiment, the fitting clearance FC is configured such that the first clearance FC1 located closest to the root side becomes the smallest. Therefore, even if the deflection of the projecting portion 21 rotates around the rotation axis O in a state where the projecting portion 21 is eccentric with respect to the rotation axis O so that the deflection of the projecting portion 21 occurs, since a root side part of the cylindrical outer peripheral surface 22 is in contact with the tube main body 10, the further deflection of the projecting portion 21 is prevented. Hence, the inclined outer peripheral surface 23 which is the tip end side part of the projecting portion 21 is prevented from contacting the tube main body 10, and therefore, it is possible to further suppress the joining failure.

Further, in the present embodiment, the end surface 15 of the tube main body 10 and the end surface 26 of the flange portion 25 are formed such that the inclined end surface 17 and the flange inclined surface 28 contact at the radially inner side, and the vertical end surface 16 and the flange vertical surface 27 does not contact to form the opposing clearance OC at the radially outer side. Thus, the flowing material which is melted between the inclined end surface 17 of the tube main body 10 and the flange inclined surface 28 of the flange portion 25 contacting at the beginning of the friction welding easily flow radially outward toward the opposing clearance OC. In this way, it is possible to control the burr caused by friction welding so as to improve the quality of the joined body.

Hereinafter, the configuration, operation, and effect of the embodiment of the present invention will be collectively described.

In the manufacturing method for manufacturing the joined body (cylinder tube 100, piston rod 101) by joining the first member (tube main body 10, rod body 30) and the second member (head member 20, screw member 40, rod head 50), the first member has the hollow portion (through hole 11, 30A) formed on the end surface 15, 31A, the second member has the projecting portion 21, 41, 51 to be fitted into the hollow portion (through holes 11, 30A) and the flange portion 25, 42, 52 provided so as to extend radially outward from the projecting portion 21, 41, 51. The manufacturing method includes: the first joining step of generating frictional heat between the end surface 15 and the flange portion 25, 42, 52, by relatively rotating the first member (tube main body 10, rod body 30) and the second member (head member 20, screw member 40, rod head 50) about the rotation axis O in a state in which the hollow portion (through hole 11, 30A) and the projecting portion 21 are fitted with the fitting clearance FC and by bringing the end surface 15, 31A of the first member (tube main body 10, rod body 30) and the flange portion 25, 42, 52 of the second member (head member 20, screw member 40) into contact with each other; and the second joining step of joining the end surface 15 of the first member (tube main body 10, rod body 30) and the flange portion 25, 42, 52 of the second member (head member 20, screw member 40) by relatively moving the first member (tube main body 10, rod body 30) and the second member (head member 20, screw member 40) along the rotation axis O in a direction approaching each other in a state where the relative rotation speed of the first member (tube main body 10, rod body 30) and the second member (head member 20, screw member 40) is lower than that of the first joining step. The first member (tube main body 10, rod body 30) includes the inclined inner peripheral surface 13 having the inner diameter that decreases as the distance from the end surface 15 of the first member (tube main body 10, rod body 30) along the rotation axis O increases. The inclined inner peripheral surface 13 of the first member (tube main body 10, rod body 30) forms the hollow portion (through holes 11, 30A). In the second joining step, flowing material is allowed to plastically flow from the end surface 15 of the first member (tube main body 10, rod body 30) and the flange portion 25, 42, 52 of the second member (head member 20, screw member 40) to fill the fitting clearance FC from the root side of the projecting portion 21, 41, 51 until the tip portion T of the flowing material reaches a region of the inclined inner peripheral surface 13 in the rotation axial direction, thereby joining the first member (tube main body 10, rod body 30) with a non-contact portion 26b of the flange portion 25, 42, 52 facing the fitting clearance FC by the flowing material and joining the first member (tube main body 10, rod body 30) with the projecting portion 21, 41, 51 by the flowing material.

In this configuration, in the second bonding step, the flowing material is filled into the fitting clearance FC until the tip portion T thereof is located within the axial range of the inclined inner peripheral surface 13 of the first member (tube main body 10, rod body 30). The inclined inner peripheral surface 13 has the inner diameter that decrease as the distance from the end surface 15, 31A, 31B of the first member (tube main body 10, rod body 30) along the rotation axis O increases. Therefore, the fitting clearance FC formed between the inclined inner peripheral surface 13 and the outer peripheral surface of the projecting portion 21, 41, 51 in the radial direction decrease as the first member (tube main body 10, od body 30) and the second member (head member 20, screw member 40, rod head 50) are pressed against each other along the rotation axis O in the second joining step. Therefore, even if the fitting clearance FC between the first member (tube main body 10, rod body 30) and the projecting portion 21 of the second member (head member 20, screw member 40, rod head 50) is set to be relatively large so that in the first joining step the projecting portion 21, 41, 51 of the first member (tube main body 10, rod body 30) and the second member (head member 20, screw member 40, rod head 50) do not come into contact unintentionally in the first joining step, the flowing material is filled in the relatively small fitting clearance FC formed in the second joining step. Thus, the surface area at which the flowing material filled in the fitting clearance FC is in contact with the air is reduced, and the generation of oxidation scale is suppressed. As a result, generation of oxidation scale and joining failure are suppressed in the manufacturing method for the joined body.

Further, in the manufacturing method for the joined body according to the present embodiment, the projecting portion 21, 41, 51 includes; the cylindrical outer peripheral surface 22 having the uniform outer diameter along the rotation axis O, and the inclined outer peripheral surface 23 provided on the tip end side of the projecting portion 21, 41, 51 than the cylindrical outer peripheral surface 22, the inclined outer peripheral surface 23 being to be joined to the inclined inner peripheral surface 13 of the hollow portion (through holes 11, 30A) by the flowing material, and the inclined outer peripheral surface 23 having the outer diameter that decreases as the distance from the flange portion 25 along the rotation axis O increases, the first member (tube main body 10, rod body 30) further includes the first cylindrical inner peripheral surface 12 connected to the end surface 15 of the first member (tube main body 10, rod body 30), the first cylindrical inner peripheral surface 12 having a uniform inner diameter along the rotation axis O. In the first joining step, the inclined outer peripheral surface 23 of the projecting portion 21 is accommodated inside the inclined inner peripheral surface 13 of the hollow portion (through holes 11, 30A), and the first clearance FC1 formed between the first cylindrical inner peripheral surface 12 of the hollow portion (through holes 11, 30A) and the cylindrical outer peripheral surface 22 of the projecting portion 21 is smaller than the second clearance FC2 formed between the inclined inner peripheral surface 13 of the hollow portion (through holes 11, 30A) and the inclined outer peripheral surface 23 of the projecting portion 21, 41, 51.

In this configuration, since the first clearance FC1 formed at the root side of the projecting portions 21, 41, 51 is smaller than the second clearance FC2, even if the deflection of the projecting portions 21, 41, 51 occurs, the first cylindrical inner peripheral surface 12 and the cylindrical outer peripheral surface 22 forming the relatively small first clearance FC1 contact. Therefore, the contact between the inclined inner peripheral surface 13 of the tube main body 10 and the inclined outer peripheral surface 23 of the projecting portion 21 on the tip end side of the projecting portion 21, 41, 51 is suppressed, it is possible to suppress the unintentional contact between the first member (tube main body 10, rod body 30) and the second member (head member 20, screw member 40, rod head 50) at the tip end side of the projecting portion 21. As a result, it is possible to suppress the occurrence of burrs, in the hollow portion (through holes 11, 30A), formed by melted material due to unintentional contact between the first member (tube main body 10, rod body 30) and the second member (head member 20, screw member 40, rod head 50) at the tip end side of the projecting portions 21, 41, 51.

Further, in the manufacturing method for the joined body according to the present embodiment, the inclined inner peripheral surface 13 is a tapered surface inclined at a predetermined angle with respect to the rotation axis O, and the inclined outer peripheral surface 23 is a tapered surface inclined at the same angle as the inclined inner peripheral surface 13 with respect to the rotation axis O.

Further, the manufacturing method for the joined body according to the present embodiment, in the first joining step, the contact portion 26a of the flange portions 25, 42, 52 is brought into contact with the end surface 15, 31A, 31B of the first member, and the opposing clearance OC is formed between the clearance portion 26c provided on the outside in the radial direction than the contact portion 26a in the flange portion 25, 42, 52 and the end surface 15, 31A of the first member (tube main body 10, rod body 30). In the second joining step, the end surface 15, 31A, 31B of the first member (tube main body 10, rod body 30) and the clearance portion 26c are joined by material flow which is plastically flowed from between the contact portion 26a of the flange portion 25, 42, 52 of the second member (head member 20, screw member 40, rod head 50) and the end surface 15, 31A of the first member (tube main body 10, rod body 30) so as to be filled in the opposing clearance OC.

In this configuration, the contact portion 26a of the flange portion 25, 42, 52 is provided radially inside than the clearance portion 26c to form the opposing clearance OC with between the end surface 15, 31A, 31B of the first member (tube main body 10, rod body 30). Therefore, the first member (tube main body 10, the rod body 30) of the end surface 15, 31A, 31B and the material melted between the end surface 15, 31A, 31B of the first member (tube main body 10, rod body 30) and the contact portion 26a of the flange portion 25, 42, 52 of the second member (head member 20, screw member 40, rod head 50) tends to flow radially outward toward the opposing clearance OC between the end surface 15, 31A, 31B of the first member (tube main body 10, rod body 30) and the clearance portion 26c. Thus, it is possible to control the burr caused by friction welding in the manufacturing of the joined body.

In the manufacturing method for the joined body according to the present embodiment, the flange portions 25, 42, 52 includes the flange inclined surface 28 on which the contact portion 26a is provided to be continuous with the outer peripheral surface of the projecting portions 21, 41, 51. The flange inclined surface 28 is inclined with respect to the rotation axis O. The inclined end surface 17 is provided on the end surfaces 15, 31A, 31B of the first member (the tube main body 10, the rod body 30). The inclined end surface is formed in a shape corresponding to the flange inclined surface 28 and brought into contact with the contact portion 26a.

In this configuration, the flange portion 25, 42, 52 is continuous to the projecting portion 21 by the flange inclined surface 28 inclined with respect to the rotation axis O. The contact portion 26a is provided on the flange inclined surface 28. Thus, since a corner at right angle is not formed between the flange portion 25, 42, 52 and the projecting portion 21, 41, 51, it is easy to control the flowing material, and it is possible to improve the quality of the joined body.

Further, in the manufacturing method for the joined body according to the present embodiment, the flange portion 25, 42, 52 includes the flange vertical surface 27 formed perpendicularly to the rotation axis O. The contact portion 26a is provided on the flange vertical surface 27. The end surface 15, 31A, 31B of the first member (tube main body 10, rod body 30) is provided with the vertical end surface 16 formed perpendicularly to the rotation axis O and to be in contact with the contact portion 26a. At least one of the clearance portion of the flange portion 25, 42 and the part of the end surfaces 15, 31A of the first member (tube main body 10, rod body 30) facing the clearance portion 26c is formed to be inclined with respect to the rotation axis O so as to form the opposing clearance OC with being separate from the other.

In this configuration, since the first member (tube main body 10, the rod body 30) and the second member (head member 20, the screw member 40, rod head 50) contact at the flange vertical surface 27 and the vertical end surface 16 respectively perpendicular to the rotation axis O, it is easy to control the relative movement amount between the first member (tube main body 10, rod body 30) and the second member (head member 20, screw member 40, rod head 50) along the rotation axis O. Therefore, it is possible to improve the quality of the joined body.

The embodiments of the present invention described above are merely illustration of some application examples of the present invention and not of the nature to limit the technical scope of the present invention to the specific constructions of the above embodiments.

This application claims priority based on Japanese Patent Application No. 2018-181925 and No. 2018-181926 filed with the Japan Patent Office on Sep. 27, 2018, the entire contents of which are incorporated into this specification.

The invention claimed is:

1. A manufacturing method for manufacturing a joined body by joining a first member and a second member, the first member having a hollow portion formed on an end surface thereof, the second member having a projecting portion to be fitted into the hollow portion and a flange portion provided so as to extend radially outward from the projecting portion, the manufacturing method comprising:
   a first joining step of generating frictional heat between the end surface of the first member and the flange portion of the second member by relatively rotating the first member and the second member about a rotation axis in a state in which the hollow portion and the projecting portion are fitted with a predetermined fitting clearance, and by bringing a part of the end surface of the first member into contact with a contact portion of the flange portion of the second member to form a contact part; and
   a second joining step of joining the end surface of the first member and the flange portion of the second member by relatively moving the first member and the second member along the rotation axis in a direction approaching each other in a state in which the relative rotation speed between the first member and the second member is lower than that in the first joining step, wherein
   the first member includes an inclined inner peripheral surface having an inner diameter that decreases as a distance from the end surface of the first member along the rotation axis increases, the inclined inner peripheral surface of the first member forming the hollow portion, and
   in the second joining step, flowing material, which plastically flows from the contact part between the part of the end surface of the first member and the contact portion of the flange portion of the second member that contact each other, fills in the fitting clearance from an end thereof located at a root side of the projecting portion until a tip portion of the flowing material reaches a region of the inclined inner peripheral surface in the rotation axial direction, thereby joining the first member with a non-contact portion of the flange portion facing the fitting clearance by the flowing material and joining the first member with the projecting portion by the flowing material.

2. The manufacturing method for the joined body according to claim 1, wherein
   the projecting portion includes;
      a cylindrical outer peripheral surface having a uniform outer diameter along the rotation axis; and
      an inclined outer peripheral surface provided on a tip end side of the projecting portion than the cylindrical outer peripheral surface, the inclined outer peripheral surface being to be joined to the inclined inner peripheral surface of the hollow portion by the flowing material, and the inclined outer peripheral surface having an outer diameter that decreases as the distance from the flange portion along the rotation axis increases,
   the first member further includes a cylindrical inner peripheral surface connected to the end surface of the first member, the cylindrical inner peripheral surface having a uniform inner diameter along the rotation axis, and
   in the first joining step, the inclined outer peripheral surface of the projecting portion is accommodated inside the inclined inner peripheral surface of the hollow portion, and a root side clearance formed between the cylindrical inner peripheral surface of the hollow portion and the cylindrical outer peripheral surface of the projecting portion is smaller than a tip end side clearance formed between the inclined inner peripheral surface of the hollow portion and the inclined outer peripheral surface of the projecting portion.

3. The manufacturing method for the joined body according to claim 2, wherein
   the inclined inner peripheral surface is a tapered surface inclined at a predetermined angle with respect to the rotation axis, and
   the inclined outer peripheral surface is a tapered surface inclined at the same angle as the inclined inner peripheral surface with respect to the rotation axis.

4. The manufacturing method for the joined body according to claim 1, wherein
   in the first joining step, the contact portion of the flange portion of the second member is brought into contact with the part of the end surface of the first member, and an opposing clearance is formed between a clearance portion provided on the flange portion at a position radially outward of the contact portion and an other part of the end surface of the first member, the clearance portion being separated from the end surface of the first member, and
   in the second joining step, the end surface of the first member and the clearance portion are joined by the flowing material plastically flowing from the contact part between the part of the end surface of the first member and the contact portion of the flange portion of the second member so as to fill in the opposing clearance.

5. The manufacturing method for the joined body according to claim 4, wherein
   the flange portion includes a flange inclined surface on which the contact portion is provided, the flange inclined surface being continuous with an outer peripheral surface of the projecting portion, the flange inclined surface being inclined with respect to the rotation axis, and an inclined end surface is provided on the end surface of the first member, the inclined end surface being formed in a shape corresponding to the flange inclined surface, the inclined end surface being to be in contact with the contact portion to form the contact part.

6. The manufacturing method for the joined body according to claim 4, wherein the flange portion includes a flange vertical surface formed perpendicularly to the rotation axis, the contact portion being provided on the flange vertical surface, the end surface of the first member is provided with a vertical end surface formed perpendicularly to the rotation axis and being to be in contact with the contact portion, at least one of the clearance portion of the flange portion and the other part of the end surface of the first member facing the clearance portion is formed to be inclined with respect to the rotation axis so as to form the opposing clearance with being separate from the other.

* * * * *